(12) United States Patent
Zhao et al.

(10) Patent No.: US 12,502,710 B2
(45) Date of Patent: Dec. 23, 2025

(54) METHOD FOR PREPARING POWDER MATERIAL AND APPLICATION THEREOF

(71) Applicant: Yuanyun Zhao, Guangdong (CN)

(72) Inventors: Yuanyun Zhao, Guangdong (CN); Li Liu, Guangdong (CN)

(73) Assignee: Yuanyun Zhao, Dongguan (CN)

( * ) Notice: Subject to any disclaimer, the term of this patent is extended or adjusted under 35 U.S.C. 154(b) by 533 days.

(21) Appl. No.: 17/910,980

(22) PCT Filed: Nov. 23, 2020

(86) PCT No.: PCT/CN2020/130961
§ 371 (c)(1),
(2) Date: Sep. 12, 2022

(87) PCT Pub. No.: WO2021/179677
PCT Pub. Date: Sep. 16, 2021

(65) Prior Publication Data
US 2023/0158568 A1    May 25, 2023

(30) Foreign Application Priority Data

Mar. 12, 2020   (CN) .......................... 202010170579.1
Jul. 14, 2020    (CN) .......................... 202010673087.4
Nov. 14, 2020   (CN) .......................... 202011273980.4

(51) Int. Cl.
| | | |
|---|---|---|
| *B22F 1/05* | (2022.01) | |
| *B22F 1/054* | (2022.01) | |
| *B22F 1/065* | (2022.01) | |
| *B22F 1/145* | (2022.01) | |
| *B22F 9/06* | (2006.01) | |
| *B22F 9/16* | (2006.01) | |

(52) U.S. Cl.
CPC .................. *B22F 9/16* (2013.01); *B22F 1/05* (2022.01); *B22F 1/054* (2022.01); *B22F 1/056* (2022.01); *B22F 1/065* (2022.01); *B22F 1/145* (2022.01); *B22F 9/06* (2013.01); *B22F 2301/00* (2013.01); *B22F 2301/10* (2013.01); *B22F 2301/15* (2013.01); *B22F 2301/20* (2013.01); *B22F 2301/255* (2013.01); *B22F 2301/35* (2013.01); *B22F 2304/054* (2013.01); *B22F 2304/056* (2013.01); *B22F 2304/058* (2013.01); *B22F 2304/10* (2013.01)

(58) Field of Classification Search
None
See application file for complete search history.

(56) References Cited

U.S. PATENT DOCUMENTS

| | | | | |
|---|---|---|---|---|
| 11,491,544 B2 * | 11/2022 | Liu | .................. | B22F 1/056 |
| 2006/0112785 A1 * | 6/2006 | Garbar | .................. | B22F 1/102 |
| | | | | 75/364 |
| 2019/0024216 A1 * | 1/2019 | Giri | .................. | C25B 5/00 |
| 2023/0001481 A1 * | 1/2023 | Liu | .................. | B22F 1/054 |
| 2023/0321720 A1 * | 10/2023 | Zhao | .................. | B22F 1/05 |
| | | | | 75/352 |
| 2024/0033822 A1 * | 2/2024 | Zhao | .................. | C22C 27/06 |

FOREIGN PATENT DOCUMENTS

| | | |
|---|---|---|
| CN | 1662331 A | 8/2005 |
| CN | 101590527 A | 12/2009 |
| CN | 102367527 A | 3/2012 |
| CN | 103317141 A | 9/2013 |
| CN | 104946921 A | 9/2015 |
| CN | 110775978 A | 2/2020 |
| CN | 111334682 A | 6/2020 |
| CN | 112143926 A | 12/2020 |
| WO | 2009101394 A2 | 8/2009 |

OTHER PUBLICATIONS

English translation of CN 110775978 (originally published Feb. 11, 2020), obtained from PE2E search.*
Zhang, Z. et al., "The bi-layered precipitate phase ζ in the Al—Ag alloy system", Acta Materialia, vol. 132, pp. 525-537, Available online Apr. 28, 2017.*
International Search Report of PCT/CN2020/130961.
Written Opinion of PCT/CN2020/130961.

* cited by examiner

*Primary Examiner* — George Wyszomierski

(57) ABSTRACT

The present disclosure provides a method for preparing a powder material and an application thereof. The preparation method includes: obtaining an initial alloy ribbon including a matrix phase and a dispersed particle phase by solidifying an alloy melt, and then removing the matrix phase in the initial alloy ribbon while retaining the dispersed particle phase, so as to obtain a powder material composed of original dispersed particle phase. The preparation method of the present disclosure is simple in process and can prepare multiple powder materials of nano-level, sub-micron-level and micro-level. The powder materials have good application prospects in the fields such as catalytic materials, powder metallurgy, composite materials, wave-absorbing materials, sterilization materials, metal injection molding, 3D printing and coating.

11 Claims, No Drawings

METHOD FOR PREPARING POWDER MATERIAL AND APPLICATION THEREOF

CROSS-REFERENCE TO RELATED APPLICATIONS

This Application is a national stage application of PCT/CN2020/130961. This application claims priorities from PCT Application No. PCT/CN2020/130961, filed Nov. 23, 2020, and from the Chinese patent applications 2020101705791 filed Mar. 12, 2020, 2020106730874, filed Jul. 14, 2020, and 2020112739804, filed Nov. 14, 2020, the content of which are incorporated herein in the entirety by reference.

TECHNICAL FIELD

The present disclosure relates to the technical field of micro-nano materials, and in particular, to a method for preparing a powder material and an application thereof.

BACKGROUND

The methods for preparing ultrafine powder materials with micron, sub-micron and nanometer particle sizes include, based on substance state, a solid phase method, a liquid phase method, and a gas phase method. The solid phase method mainly includes a mechanical grinding method, an ultrasonication method, a thermal decomposition method, an explosion method, etc. The liquid phase method mainly includes a precipitation method, an alkoxide method, a carbonyl method, a spray thermal drying method, a freeze drying method, an electrolysis method, a chemical condensation methods, etc. The gas phase method mainly includes a gas-phase reaction method, a plasma method, a high-temperature plasma method, an evaporation method, a chemical vapor deposition method, etc.

Although there are many methods for preparing ultrafine powder materials, each method has a certain limitation. For example, the liquid phase method has the disadvantages of low yield, high cost and a complicated process. The mechanical method has the disadvantage that it is difficult to grade a powder material after preparation of the powder material and the purity, fineness and morphology of the product are difficult to guarantee. The rotating electrode method and the gas atomization method are current major methods for preparing a high-performance metal and alloy powder, but the methods have the disadvantages of low production efficiency, low yield, and relatively large energy consumption. The jet milling method and the hydrogenation and dehydrogenation method are suitable for large-batch industrial production, but have strong selectivity to raw materials and alloys.

In addition, an impurity content, especially an oxygen content, of a powder material has a great influence on the performance of the powder material. At present, the impurity content of the metal powder or alloy powder is mainly controlled by controlling the purity and vacuum degree of a raw material, leading to high costs. Therefore, it is of great significance to develop a new method for preparing a high-purity powder material.

SUMMARY

Based on this, it is necessary to provide a simple and easily-operated method for preparing a powder material so as to address the above problems.

There is provided a method for preparing a powder material, including the following steps:

at step S1: selecting initial alloy raw materials, and melting the initial alloy raw materials according to a ratio of initial alloy ingredients to obtain a homogeneous initial alloy melt containing an impurity element T, where T includes at least one of O, H, N, P, S, F, Cl, I, and Br, and an average ingredient of the initial alloy melt is $A_aM_bT_d$; A includes at least one of Zn, Mg, Sn, Pb, Ga, In, Al, La, Ge, Cu, K, Na, and Li; M includes at least one of B, Bi, Fe, Ni, Cu, Ag, Cr, V, Si, and Ge; a, b and d represent the atomic percent contents of corresponding constituent elements, where 60%≤a≤99.5%, 0.5%≤b≤40%, 0≤d≤10%;

at step S2: solidifying the initial alloy melt into an initial alloy ribbon with a solidification structure including a matrix phase and a dispersed particle phase, where a melting point of the matrix phase is lower than that of the dispersed particle phase and the dispersed particle phase is wrapped in the matrix phase; during a solidification process of the initial alloy melt, the impurity element T in the initial alloy melt is redistributed in the dispersed particle phase and the matrix phase and enriched in the matrix phase, so as to purify the dispersed particle phase;

where a major ingredient of the dispersed particle phase in the initial alloy ribbon is $M_{x1}T_{z1}$, and an average ingredient of the matrix phase is mainly $A_{x2}T_{z2}$; where 98.5%≤x1≤100%, 0≤z1≤1.5%; 80%≤x2≤100%, 0≤z2≤20%; z1≤d≤z2, 2z1≤z2; and x1, z1, x2, and z2 represent atomic percent contents of the corresponding constituent elements respectively;

at step S3: removing the matrix phase from the initial alloy ribbon while retaining the dispersed particle phase which is not removed in the removal process of the matrix phase, and collecting the separated dispersed particle phase to obtain a target high-purity powder material composed of original dispersed particles.

In step S1:

Furthermore, A includes at least one of Sn, Pb, Ga, In, Al, La, Ge, Cu, K, Na, and Li; M includes at least one of B, Bi, Fe, Ni, Cu, and Ag.

Preferably, when M includes B, A includes at least one of Sn, Ge, and Cu; when M includes Bi, A includes at least one of Sn, Ga, and Al; when M includes Fe, A includes at least one of La, In, Na, K, Li; when M includes Ni, A includes at least one of Na, K, and Li; when M includes Cu, A includes at least one of Pb, Na, K, and Li; and when M includes Ag, A includes at least one of Pb, Na, and K.

Furthermore, when M includes at least one of Si and Ge, A includes at least one of Zn, Sn, Pb, Ga, In, Ag, Bi, and Al; when M includes at least one of B, Cr, and V, A includes Zn; and when M includes Fe, A includes Mg.

Furthermore, 60%≤a<99.5%, 0.5%≤b<40%, 0<d≤10%.

Furthermore, the impurity element T in the initial alloy melt comes from impurities introduced by the initial alloy raw materials and impurities introduced by an atmosphere or crucible in a melting process. The impurities introduced by atmosphere refer to the impurities such as O, N and H in an environmental atmosphere, which are absorbed by the alloy melt.

Furthermore, T is an impurity element including at least one of O, H, N, P, S, F, Cl, I and Br, and a total content of these impurity elements is the content of the impurity element T.

Furthermore, if the raw materials are elementary substances or intermediate alloys, which contain an impurity element, the initial alloy melt can be prepared by melting based on a ratio. If the provided raw materials are alloy raw materials corresponding to the ingredients of the initial alloy melt, these alloy raw materials can be re-melted to obtain an initial alloy melt.

Furthermore, the initial alloy raw materials include an M-T raw material containing the impurity element T. For example, when M is Fe and T includes O, the M-T raw material is a Fe—O raw material containing the impurity O.

Furthermore, the combination of A and M in the average ingredient of the initial alloy melt in step S1 is extremely important and its selection principle aims to ensure that no intermetallic compound is formed between A and M during solidification of the alloy melt. In this way, separation of the matrix phase with A as a dominant ingredient and the particle phase with M as a dominant ingredient can be realized during the solidification of the initial alloy melt, which is beneficial to the subsequent preparation of a powder material with M as dominant ingredient.

In step S2:

Furthermore, the initial alloy ribbon does not contain an intermetallic compound composed of A and M.

Furthermore, the alloy melt can be solidified by melt spinning or continuous casting. Generally, a thin initial alloy ribbon can be obtained by melt spinning; a thick initial alloy ribbon can be obtained by continuous casting.

Furthermore, the thin alloy ribbon obtained by melt spinning and the thick alloy ribbon obtained by continuous casting both are totally different in morphology from an alloy ingot obtained by ordinary casting. Usually, the alloy ingot obtained by ordinary casting has no obvious length, width and thickness in scale.

Furthermore, the initial alloy ribbon has a thickness of 5 μm to 10 mm; furthermore, the initial alloy ribbon has a thickness of 5 μm to 5 mm; preferably, the initial alloy ribbon has a thickness of 5 μm to 1 mm; further preferably, the initial alloy ribbon has a thickness of 5 μm to 200 μm; further preferably, the initial alloy ribbon has a thickness of 5 μm to 20 μm.

It should be noted that, when the thickness of the initial alloy ribbon is at millimeter level, the initial alloy ribbon may also be called an alloy sheet.

Furthermore, the width of the cross section of the initial alloy ribbon is two or more times its thickness; furthermore, the length of the initial alloy ribbon is 10 or more times its thickness; preferably, the length of the initial alloy ribbon is 50 or more times its thickness; preferably, the length of the initial alloy ribbon is 100 or more times its thickness.

Furthermore, a solidification rate of the initial alloy melt is in a range of 1K/s to $10^7$K/s.

Furthermore, a particle size of the dispersed particle phase is related to the solidification rate of the initial alloy melt. Usually, the particle size of the dispersed particle phase is in a negative correlation relationship with the solidification rate of the initial alloy melt, that is, the larger the solidification rate of the initial alloy melt is, the smaller the particle size of the dispersed particle phase is.

Furthermore, the particle size of the dispersed particle phase is in a range of 2 nm to 3 mm; furthermore, the particle size of the dispersed particle phase is in a range of 2 nm to 500 μm; preferably, the particle size of the dispersed particle phase is in a range of 2 nm to 99 μm; further preferably, the particle size of the dispersed particle phase is in a range of 2 nm to 5 μm; further preferably, the particle size of the dispersed particle phase is in a range of 2 nm to 200 nm; further preferably, the particle size of the dispersed particle phase is in a range of 2 nm to 100 nm.

Furthermore, when the solidification rate of the initial alloy melt is in a range of $10^5$K/s to $10^7$K/s, dispersed particles with a major particle size of nano-level can be obtained.

Furthermore, when the solidification rate of the initial alloy melt is in a range of $10^4$K/s to $10^5$K/s, dispersed particles with a major particle size of sub-micron level can be obtained.

Furthermore, when the solidification rate of the initial alloy melt is in a range of $10^2$K/s to $10^4$K/s, dispersed particles with a major particle size of micron level can be obtained.

Furthermore, when the solidification rate of the initial alloy melt is 1K/s to $10^2$ K/s, dispersed particles with a major particle size of millimeter level can be obtained.

Furthermore, a particle shape of the dispersed particle phase is not limited and may include at least one of dendritic shape, spheroidal shape, subspheroidal shape, cubic shape, pie shape and bar shape. When the particle shape is a bar shape, the particle size specifically refers to a diameter size of the cross section of the bar.

Furthermore, when the dispersed particles are at nano-level or sub-micron-level, it is highly probable to obtain spheroidal or subspheroidal particles; when the dispersed particles are at micron level and higher, it is highly probable to obtain dendritic particles.

Furthermore, the dispersed particle phase is solidified and separated out from the initial alloy melt. Based on nucleation growth theory, regardless of the subspheroidal nano-particles with nucleation newly grown up and the dendritic particles of micron-level and millimeter-level with nucleation fully grown up, their crystal growths have fixed orientation relationship, such that a separated single particle is mainly composed of one mono-crystal.

When a volume percent content of the dispersed particles in the entire initial alloy ribbon is high, there may be a case that two or more particles are combined in an endogenous separation of monocrystalline particles. If two or more monocrystalline particles are only softly agglomerated, or mutually adsorbed or connected together through contact of only a small part and are not fully combined into one particle through normal grain boundary like a polycrystalline material, they are still two monocrystalline particles. It is characterized in that, after the matrix phase is removed in a subsequent process, these monocrystalline particles can be easily separated by a technique such as ultrasonic dispersion treatment and jet milling But, for the polycrystalline materials of normal tough metals or alloys, it is difficult to separate the grain boundary by a technique such as ultrasonic dispersion processing and jet milling.

Preferably, a ratio of the number of monocrystalline particles of the dispersed particles to a total number of the dispersed particles in the initial alloy ribbon is not less than 60%.

Further preferably, the ratio of the number of monocrystalline particles of the dispersed particles to the total number of the dispersed particles is not less than 90%.

Furthermore, for a certain initial alloy ribbon, the volume percent content of the dispersed particle phase in the initial alloy ribbon can be determined through calculation based on the ingredients of the corresponding initial alloy melt, the ingredient of the dispersed particle phase and the ingredient of the matrix phase in combination with atomic weights and density parameters of the elements and the like.

Furthermore, the volume percent content of the dispersed particle phase in the corresponding initial alloy ribbon is not higher than 50%.

Furthermore, $98.5\% \leq x1 < 100\%$, $0 < z1 \leq 1.5\%$; $80\% \leq x2 < 100\%$, $0 < z2 \leq 20\%$; $z1 < d < z2$, $2z1 < z2$.

Furthermore, an atomic percent content z1 of the impurity element T in the dispersed particles is less than an atomic percent content of the impurity element T in the M-T raw material.

Furthermore, $z1 \leq d \leq z2$, and $2z1 \leq z2$.

Preferably, $z1 \leq d \leq z2$, and $3z1 \leq z2$, that is, the T impurity content in the dispersed particle phase is lower than that in the initial alloy melt, and 3 times of the T impurity content in the dispersed particle phase is still lower than that in the matrix phase.

In the present disclosure, the T impurity content is expressed by using an atomic percent content. The composition of the elements can be represented by using the atomic percent contents of the elements such that the increase or decrease of the contents of the elements, for example, the increase or decrease of the contents of the impurity elements, can be accurately expressed using the concept of substance amount. If the contents of various elements are represented by using weight percent contents (or PPM) of the elements, an incorrect conclusion is easy to reach due to different atomic weights of the elements. For example, if an alloy with an atomic percent content being $Ti_{45}Gd_{45}O_{10}$ contains 100 atoms, where the atomic percent content of O is 10 at %. The 100 atoms are divided into $Ti_{45}O_4$ (atomic percent composition is $Ti_{91.8}O_{8.2}$) and $Gd_{45}O_6$ (atomic percent composition is $Gd_{88.2}O_{11.8}$). The atomic percent content of oxygen in $Gd_{45}O_6$ is increased to 11.8 at %, and the atomic percent content of oxygen in $Ti_{45}O_4$ is decreased to 8.2 at %, and thus it is accurately shown that O is enriched in Gd. If measured by a weight percent content of O, the weight percent content of O in $Ti_{45}Gd_{45}O_{10}$ is 1.70 wt %, the weight percent contents of O in $Ti_{45}O_4$ and $Gd_{45}O_6$ are 2.9 wt. % and 1.34 wt. % respectively. In this case, an incorrect conclusion that the content of O in $Ti_{45}O_4$ is obviously increased compared with the content of O in $Gd_{45}O_6$ can be made.

Furthermore, the dispersed particle phase with a major ingredient of $M_{x1}T_{z1}$ in the initial alloy ribbon does not contain element A;

Furthermore, the ingredient of the dispersed particle phase in the initial alloy ribbon is $M_{x1}T_{z1}$.

In step S3:

Furthermore, the method for removing the matrix phase from the alloy ribbon includes at least one of acid reaction removal, alkali reaction removal, and vacuum volatilization removal.

The composition and concentration of an acid solution and a alkali solution are not specifically limited, as long as the matrix phase can be removed and the dispersed particle phase can be retained at the same time.

The temperature and vacuum degree of the vacuum treatment are not specifically limited, as long as the matrix phase can be removed and the dispersed particle phase can be retained at the same time.

Furthermore, the method for removing the matrix phase in the initial alloy ribbon includes removing the matrix phase by natural oxidation-powdering peeling.

When the matrix phase is an element extremely easy to undergo natural oxidation with oxygen, for example, La, or the like, the matrix phase can be separated from the dispersed particle phase through natural oxidation-powdering process of the matrix phase, and then the dispersed particle phase with magnetism or the like is separated from the natural oxides of the matrix phase by using other technical means, for example, magnetic selection.

Furthermore, since the target powder material is the dispersed particle phase separated from the initial alloy ribbon, the ingredient and particle size and the like of the target powder material are all equivalent to the ingredient and particle size of the corresponding dispersed particle phase.

Furthermore, the particle size of the target powder material is in a range of 2 nm to 3 mm; preferably, the particle size of the target powder material is in a range of 2 nm to 500 µm; preferably, the particle size of the target powder material is in a range of 2 nm to 99 µm; further preferably, the particle size of the target powder material is in a range of 2 nm to 5 µm; further preferably, the particle size of the target powder material is in a range of 2 nm to 200 nm; further preferably, the particle size of the target powder material is in a range of 2 nm to 100 nm.

Furthermore, after the initial alloy ribbon reacts with the acid solution, the dispersed particles are separated from the initial alloy ribbon, and then cleaned and dried, so as to obtain the target powder material.

Furthermore, the target powder material with the major ingredient $M_{x1}T_{z1}$ does not contain element A.

Furthermore, the major ingredient of the target powder material is $M_{x1}T_{z1}$ preferably, the ingredient of the target powder material is $M_{x1}T_{z1}$.

Furthermore, the atomic percent content of the impurity element T in the target powder material is not greater than 1.5%.

Furthermore, the following steps can also be performed after step S3: after the powder material is sieved, plasma spheroidization is performed for the powder material with a particle size of 5 µm to 200 µm to obtain a spheroidal powder material.

The present disclosure also relates to an application of the powder material or the spheroidal powder material obtained by the forgoing method in catalytic material, powder metallurgy, composite material, wave-absorbing material, sterilization material, metal injection molding, 3D printing, and coating.

Furthermore, the application of the spheroidal powder material obtained by the forgoing method in the field of metal powder 3D printing is characterized in that the spheroidal powder material has a particle size of 10 µm to 200 µm.

Furthermore, the application of the powder material obtained by the forgoing method in metal injection molding and powder metallurgy is characterized in that the powder material has a particle size of 0.1 µm to 200 µm.

Furthermore, the application of the powder material obtained by the forgoing method in coating is characterized in that the powder material has a particle size of 2 nm to 5 µm.

The present disclosure further relates to an alloy ribbon, which is characterized in that it includes an endogenous powder and a wrapping body. The solidification structure of the alloy ribbon includes a matrix phase as the wrapping body and a dispersed particle phase as the endogenous powder. The melting point of the wrapping body is lower than that of the endogenous powder, and the endogenous powder is wrapped in the wrapping body;

A major ingredient of the endogenous powder in the alloy ribbon is $M_{x1}T_{z1}$; a major average ingredient of the wrapping body is $A_{x2}T_{z2}$; where $98.5\% \leq x1 \leq 100\%$, $0 \leq z1 \leq 1.5\%$; $80\% \leq x2 \leq 100\%$, $0 \leq z2 \leq 20\%$; $z1 \leq d \leq z2$, $2z1 \leq z2$; x1, z1, x2, and z2 represent the atomic percent contents of the corresponding constituent elements respectively. A includes at least one of Sn, Pb, Ga, In, Al, La, Ge, Cu, K, Na and Li; M includes at least one of B, Bi, Fe, Ni, Cu and Ag.

Preferably, when M includes B, A includes at least one of Sn, Ge and Cu; when M includes Bi, A includes at least one of Sn, Ga and Al; when M includes Fe, A includes at least one of La, In, Na, K and Li; when M includes Ni, A includes at least one of Na, K and Li; when M includes Cu, A includes at least one of Pb, Na, K and Li; when M includes Ag, A includes at least one of Pb, Na and K.

Furthermore, when M includes at least one of Si and Ge, A includes at least one of Zn, Sn, Pb, Ga, In, Ag, Bi and Al; when M includes at least one of B, Cr, and V, A includes Zn; when M includes Fe, A includes Mg.

Furthermore, the endogenous powder with the major ingredient $M_{x1}T_{z1}$ in the alloy ribbon does not include element A.

Preferably, in the alloy ribbon, the ingredient of the endogenous powder is $M_{x1}T_{z1}$, and the average ingredient of the wrapping body is $A_{x2}T_{z2}$.

Furthermore, the thickness of the alloy ribbon is in a range of 5 μm to 10 mm; preferably, the thickness of the alloy ribbon is in a range of 5 μm to mm; preferably, the thickness of the alloy ribbon is in a range of 5 μm to 1 mm; further preferably, the thickness of the alloy ribbon is in a range of 5 μm to 200 μm; further preferably, the thickness of the alloy ribbon is in a range of 5 μm to 20 μm.

Furthermore, the width of the cross section of the initial alloy ribbon is two or more times its thickness; furthermore, the length of the initial alloy ribbon is 10 or more times its thickness; preferably, the length of the initial alloy ribbon is 50 or more times its thickness; preferably, the length of the initial alloy ribbon is 100 or more times its thickness.

Furthermore, the particle size of the endogenous powder is in a range of 2 nm to 3 mm; preferably, the particle size of the endogenous powder is in a range of 2 nm to 500 μm; preferably, the particle size of the endogenous powder is in a range of 2 nm to 99 μm; further preferably, the particle size of the endogenous powder is in a range of 2 nm to 10 μm; further preferably, the particle size of the endogenous powder is in a range of 2 nm to 1 μm; further preferably, the particle size of the endogenous powder is in a range of 2 nm to 200 nm; further preferably the particle size of the endogenous powder is in a range of 2 nm to 100 nm.

Furthermore, the particle shape of the endogenous powder includes at least one of dendritic shape, spheroidal shape, subspheroidal shape, cubic shape, pie shape and bar shape.

Furthermore, the ratio of the number of monocrystalline particles in the endogenous powder to the total number of the particles of the endogenous powder in the alloy ribbon is not less than 60%.

Furthermore, the volume percent content of the endogenous powder in the alloy ribbon is not more than 50%.

Furthermore, $98.5\% \leq x1 < 100\%$, $0 < z1 \leq 1.5\%$; $80\% \leq x2 < 100\%$, $0 < z2 \leq 20\%$; $z1 < d < z2$, $2z1 < z2$.

Furthermore, $2z2 \leq z1$ and $0 \leq z2 \leq 1.5\%$.

Preferably, $3z2 < z1$ and $0 < z2 \leq 1.5\%$.

Further preferably, $3z2 < z1$ and $0 < z2 \leq 0.75\%$.

It should be noted that A, M or T in the solutions of the present disclosure may also include other elements or impurity elements than those listed above. As long as the introduction of or the change of content of these elements do not bring an "essential" result to the solidification process and the law of the initial alloy, no impact will be caused to the implementation of the above technical solutions of the present disclosure.

Specifically, the result that the solidification process and the law of the initial alloy does not undergo "essential change" means that, when the A, M or T includes other elements or impurity elements than those listed above, the factual processes and laws listed in 1)-3) below still exist:

1) The initial alloy ribbon does not contain an intermetallic compound mainly composed of A and M.

2) The solidification structure of the initial alloy ribbon includes a matrix phase and a dispersed particle phase; the melting point of the matrix phase is lower than that of the dispersed particle phase, and the dispersed particle phase is wrapped in the matrix phase.

3) When the T impurity content of the initial alloy melt is not 0, the T impurity content of the dispersed particle phase is lower than that of the initial alloy melt and two times of the T impurity content of the dispersed particle phase is still lower than the T impurity content of the matrix phase.

The technical solutions of the present disclosure have the following beneficial effects.

Firstly, through ingenious alloy design, phase separation occurs when the initial alloy melt is solidified, so that the endogenous particles of the target ingredient of a given particle size can be formed during the solidification of the initial alloy melt and can be separated in subsequent processes. Generally, nano-metal particles can be easily prepared by bottom-up chemical methods such as chemical reduction. But when the size of the particles increases to several hundred nanometers or even micron, the particles are difficult to prepare. Metal particles with a particle size of dozens of microns or several hundred microns can be easily prepared by top-down physical methods such as atomization and ball milling But when the particle size decreases to several hundred nanometers or to several microns, the particles are also difficult to prepare. In the technical solutions of the present disclosure, based on different cooling rates in the solidification process of the initial alloy ribbon, target metal powder particles of nano-level, sub-micron-level, micron-level, and even millimeter-level can be easily prepared. In this way, the above technical difficulties are overcome and significant advantages are shown.

Secondly, the target high-purity powder material is prepared from low-purity raw materials, which proposes a new way to prepare a high-purity powder material from low-purity raw materials, thereby bringing great significance. In the present disclosure, the purity of the target powder material is improved mainly by the following three mechanisms: 1) Major matrix element with high activity (such as La and Mg elements) has absorption effect on impurity elements of the initial alloy melt. There is a strong affinity between the matrix element and impurity element T since the matrix element is usually of high activity and low melting point. In this case, the impurity element T in the initial alloy melt may either enter, in a larger amount, the matrix phase mainly formed by a major matrix phase element or form molten slags with the major matrix phase element in a molten state and separated from the alloy melt. 2) The impurity element T is drained into the remaining melt during a nucleation growth process of the dispersed particle phase endogenously separated. As long as the dispersed particle phase endogenously separated out is separated out no later than the matrix phase during a solidification process, its impurity will be enriched in a portion of melt solidified last, that is, a portion of melt which is mainly composed of the major matrix phase element and solidified into the matrix phase. 3) Due to the existence of a second phase matrix, the crucible-related impurities entering the melt due to the interaction between the crucible and the melt during a melting process are also generally enriched in the second phase matrix, which further ensures the purity of the target powder material and further lowers the requirements for the crucible in the melting process, greatly reducing the production costs.

Thirdly, a target metal powder with monocrystalline particles as main can be obtained. Compared with a polycrystalline powder, a monocrystalline powder may have many significant and beneficial effects. In a solidification process of the initial alloy melt, each endogenous dispersed particle is nucleated at a particular position in the melt and then grown up in a specific atomic arrangement manner. By controlling the volume percent content of the dispersed particle phase in the initial alloy ribbon below 50%, in a case of ensuring each endogenous particle is distributed in a dispersed manner, the combined growth is difficult to occur between the endogenous particles. Therefore, the finally-obtained dispersed particle phases mostly are monocrystalline phases. For the dendritic particles with a particle size up to dozens of microns or millimeters, the growth direction of each secondary dendrite is in a phase relationship with that of the primary dendrite, and the dendritic particles still monocrystalline particles. For a polycrystalline material, the grain boundary typically contains an impurity element drained from the crystals in a solidification process, and thus, it is very difficult to obtain a high purity polycrystalline powder material. When the target powder material is mainly composed of monocrystalline particles, its purity is necessarily guaranteed. Furthermore, the surface atoms of the monocrystalline particles have specific arrangement, for example, (111)-faced arrangement etc. These specific arrangements will endow the target metal powder with special mechanical, physical and chemical performances, thereby resulting in beneficial effects.

Fourthly, for the alloy ribbon composed of the endogenous powder and the wrapping body (the matrix phase), an in-situ generated matrix phase creatively wraps the endogenous powder, thus keeping the high purity and high activity of the endogenous powder. Specifically, the metal or alloy powders prepared by a traditional chemical method or physical method, especially nano-powders with an extremely large specific surface area, are easily oxidized naturally and thus the problem of difficulty in powder storage has to be faced. In view of this problem, after the alloy ribbon composed of an endogenous metal powder and a wrapping body (the matrix phase) is prepared in the technical solution of the present disclosure, the wrapping body is not removed shortly, but directly used to protect the endogenous metal powder from being naturally oxidized. The alloy ribbon composed of the endogenous metal powder and the wrapping body can be directly used as a raw material for downstream production. Therefore, it has the potential to become one special product. When a high-purity powder is needed for the downstream production, based on characteristics of a next working procedure, the endogenous metal powder is released from the wrapping body of the alloy ribbon in a proper environment at a proper time, and then fed into the next production process in a possible short time, thereby greatly reducing the possibility that the endogenous powder is contaminated by oxygen and other impurities. For example, when the endogenous metal powder is a nano-powder, the endogenous metal powder is composited with resin while being released from the wrapping body or immediately thereafter, so as to prepare a resin-based composite material added with a highly active endogenous powder.

Fifthly, the solid alloy obtained by solidification in the step S2 is in a shape of a ribbon, which ensures product shape uniformity and mass production feasibility. When the alloy ribbon is a thin alloy ribbon, it can be prepared by using melt spinning. As long as the alloy melt flows to a rotary roller at a fixed flow rate and the rotary roller rotates at a fixed speed, a thin alloy ribbon with a uniform thickness can be obtained. Furthermore, the preparation process can be carried out continuously, facilitating mass production. When the alloy ribbon is a thick alloy ribbon, it can be prepared by a mature continuous casting which has a principle similar to the melt spinning. Alternatively, a continuous thick ribbon with uniform thickness may be obtained by use of a melt, where the preparation process may also be carried out continuously, helping mass production. When the alloy ribbon is of uniform thickness, the cooling rate is also uniform and the particle size of the obtained dispersed particles is also uniform. Comparatively, when the solid alloy obtained by solidification is in the shape of ingot, based on common knowledge, the ingot does not have uniform thickness nor obvious length and endpoints, generally causing difficulty in heat dissipation of internal melt, thus tending to obtain exceptionally large endogenous particles. Such operations are required only when large endogenous particles are to be collected and purified. Moreover, it is difficult to continuously produce ordinary ingots. Therefore, the alloy ribbon obtained by solidification in the present disclosure is suitable for subsequent use in preparing a powder material by "de-phasing" method.

Therefore, the preparation method of the present disclosure has the advantages of simple process, easy operation and low costs, and thus can prepare multiple high-purity powder materials of nano-level, sub-micron-level and micron-level. Therefore, the high-purity powder materials have good application prospect in the fields such as catalytic materials, powder metallurgy, composite materials, wave-absorbing materials, sterilization materials, magnetic materials, metal injection molding, 3D printing and coating.

As one of alternative solutions, the present disclosure further provides a method for preparing a powder material, including the following steps:

Provided is a method for preparing a powder material, including the following steps:

at step S1: providing an initial alloy, where the ingredient of the initial alloy is $A_aM_b$, the microstructure of the initial alloy is composed of a matrix phase with an ingredient A and a dispersed particle phase with an ingredient M; A is selected from at least one of Sn, Pb, Ga, In, Al, La, Ge, Cu, K, Na, and Li; M is selected from at least one of B, Bi, Fe, Ni, Cu and Ag; a, and b represent the atomic percent contents of the corresponding constituent elements respectively, where $1\% \leq b \leq 40\%$, $a+b=100\%$;

at step S2: mixing the initial alloy with a corrosive solution, so that the matrix phase reacts with the corrosive solution to change into ions and enter the solution, and the dispersed particle phase is separated out, so as to obtain a powder material with an ingredient M.

In step S1, the ingredients of the initial alloy have a specific element ratio and composition which, in principle, aims to ensure that the microstructure of the initial alloy is composed of a matrix phase with an ingredient A and a dispersed particle phase with an ingredient M, where the metal element A has a higher chemical activity than the element M.

In order to enable the metal element A and the element M to better form the matrix phase with the ingredient A and the dispersed particle phase with the ingredient M so as to further ensure separation of the matrix phase and the dispersed particle phase, descriptions are made as below.

Specifically, when M is B, A is selected from at least one of Sn, Ge and Cu;

Specifically, when M is Bi, A is selected from at least one of Sn, Ga and Al;

Specifically, when M is Fe, A is selected from at least one of La, In, Na, K and Li;

Specifically, when M is Ni, A is selected from at least one of Na, K and Li;

Specifically, when M is Cu, A is selected from at least one of Pb, Na, K and Li;

Specifically, when M is Ag, A is selected from at least one of Pb, Na and K.

In one embodiment, the initial alloy is obtained by the following method:

weighing raw materials according to a ratio and melting the raw materials to obtain an alloy melt;

solidifying the alloy melt to obtain an initial alloy, wherein a solidification rate is 1K/s to $10^7$K/s.

The initial alloy can be prepared by a method such as "solidification of the alloy melt+mechanical crushing" or "rapid-solidification and spinning of the alloy melt".

Specifically, in a process of preparing the initial alloy, the particle size of the dispersed particle phase with the ingredient M is related to the solidification rate of the alloy melt during a preparation process. Generally speaking, the particle size of the dispersed particle phase is negatively correlated with the solidification rate of the alloy melt, that is, the larger the solidification rate of the alloy melt, the smaller the particle size of the dispersed particle phase. Therefore, in the preparation process of the present disclosure, of the rate at which the alloy melt obtained by melting the raw materials is solidified into the initial alloy is preferably 1K/s to $10^7$K/s, and the dispersed particle phase in the obtained initial alloy has a particle size of 2 nm to 500 μm.

The particle shape of the dispersed particle phase is not limited, and may include at least one of a dendritic shape, a spheroidal shape, a sub-spheroidal shape, a cubic shape, a pie shape, and a bar shape. It should be noted that, when the particle shape is a bar shape, the particle size specifically refers to a diameter of a cross-section of a bar.

In step S2, when A is selected from at least one of Sn, Pb, Ga, In, Al, La, Ge, and Cu, the corrosive solution is an acid solution, and an acid in the acid solution includes at least one of hydrochloric acid, sulfuric acid, nitric acid, phosphoric acid, acetic acid, and oxalic acid.

When A is selected from at least one of Na, K, and Li, the corrosive solution is water subjected to deoxygenation treatment.

The concentration of the acid in the acid solution is only provided to react with the matrix phase and basically retain the dispersed particle phase, where the reaction temperature and time are not limited. Preferably, the molar concentration of the acid in the acid solution is 0.01 mol/L to 20 mol/L, the reaction time of this reaction may be 0.1 min to 5 h, and the reaction temperature may be 0° C. to 100° C.

Since the dispersed particle phase does not react with the corrosive solution or only slightly reacts with the corrosive solution, the particle size and morphology of the finally-formed powder material with the ingredient M are basically consistent with the particle size and morphology of the dispersed particle phase in the initial alloy, and the particle size is in a range of 2 nm to 500 μm.

In the method as a first of alternative solutions, an initial alloy with an ingredient $A_aM_b$ is prepared by selecting a metal element A with a higher chemical activity and an element M with a chemical activity lower than that of the metal element A. The microstructure of the initial alloy is composed of a matrix phase with an ingredient A and a dispersed particle phase with an ingredient M, and helps subsequent separation. Specifically, when the initial alloy reacts with the corrosive solution, the matrix phase with the ingredient A reacts with the corrosive solution to change into ions and enter the solution and the dispersed particle phase with the ingredient M does not react with the corrosive solution or only slightly reacts with the corrosive solution. Thus the dispersed particle phase is separated out from the initial alloy, thus obtaining a powder material with the ingredient M.

Therefore, compared with the traditional solid phase method, liquid phase method and gas phase method, the method, as a first of alternative solutions, has the advantages of simple process, easy operation and low cost, and can prepare multiple ultra-fine powder materials of nano-level, sub-micron-level and micron-level. The ultra-fine powder materials have good application prospect in the fields such as catalysis, powder metallurgy, sterilization and 3D printing.

As a second of alternative solutions, the present disclosure further provides a method for preparing a powder material, including the following steps.

The present disclosure further provides a method for preparing a powder material, including the following steps.

At step S1: an initial alloy with an ingredient $A_aM_b$ is selected; a and b represent the atomic percent contents of the corresponding constituent elements respectively, and 0.1%≤b≤40%, a+b=100%.

When M is at least one of Si and Ge, A includes at least one of Zn, Sn, Pb, Ga, In, Ag, Bi and Al;

when M is at least one of B, Cr and V, A is Zn;

when M is at least one of Fe and Mn, A is Mg;

when M is C, A includes at least one of Mg and Zn.

The initial alloy is fully melted to obtain an initial alloy melt. During subsequent cooling and solidification processes, no intermetallic compound is formed between A and M, but the separation of A and M occurs. A solidified state alloy in which the dispersed particle phase with the ingredient M is distributed in the matrix phase A is obtained.

At step S2: the matrix phase A in the solidified state alloy is removed, so that the dispersed particle phase that cannot be removed at the same time is retained and separated out in a dispersed manner, so as to obtain a powder material with the ingredient M.

In step S1, the ingredients of the initial alloy have a specific element ratio and composition which, in principle, aims to ensure that the solidified state alloy of the initial alloy is composed of the matrix phase with the ingredient A and the dispersed particle phase with the ingredient M.

Specifically, in a process of preparing the solidified state alloy, the particle size of the dispersed particle phase with the ingredient M is related to the solidification rate of the initial alloy melt during the preparation process. Generally speaking, the particle size of the dispersed particle phase is negatively correlated with the solidification rate of the initial alloy melt, that is, the larger the solidification rate of the initial alloy melt, the smaller the particle size of the dispersed particle phase. Therefore, in the preparation process of the present disclosure, the rate at which the initial alloy melt obtained by melting the raw materials is solidified into the solidified state alloy is preferably 1K/s to $10^7$K/s, and the particle size of the dispersed particle phase in the obtained solidified state alloy is 2 nm to 500 μm.

The thickness of the solidified state alloy is controlled at 10 μm to 50 mm. The reaction area of the obtained alloy is increased as much as possible by a method such as "solidification of the alloy melt+mechanical crushing" or "rapid solidification and spinning of the alloy melt", so as to ensure subsequent smooth removal of the matrix phase A.

The particle shape of the dispersed particle phase is not limited, and may include at least one of a dendritic shape, a spheroidal shape, a sub-spheroidal shape, a cubic shape, a pie shape, and a bar shape. It should be noted that, when the particle shape is a bar shape, the particle size specifically refers to a diameter of a cross-section of a bar.

In step S2, the matrix phase A may be removed by one of acid reaction removal, alkali reaction removal, and vacuum volatilization removal or the like.

During the process of removing the matrix A by the acid reaction, an acid in acid solution includes at least one of hydrochloric acid, sulfuric acid, nitric acid, phosphoric acid, acetic acid, and oxalic acid. The acid has a molar concentration of 0.1 mol/L to 15 mol/L, the reaction time is 1 min to 1 h, and the reaction temperature is 0° C. to 100° C.

In the process of removing the matrix A by the alkali reaction, a base of the alkali solution includes at least one of NaOH and KOH. The base has a molar concentration of 0.1 mol/L to 15 mol/L, the reaction time is 1 min to 1 h, and the reaction temperature is 0° C. to 100° C.

In a process of removing the matrix A by vacuum volatilization, a vacuum degree within a container where the solidified state alloy is located is less than 10 Pa. A treatment temperature is related to the melting point $T_m$ of the matrix phase A. The treatment temperature is in a range of $T_m$–1K to $T_m$–200K, and the treatment time is no less than 0.1 h.

Since the dispersed particle phase does not react with the corrosive solution or will not be removed through volatilization, the particle size and morphology of the finally-formed powder material with the ingredient M are basically consistent with the particle size and morphology of the dispersed particle phase in the solidified state alloy, and the particle size is in a range of 2 nm to 500 μm.

Furthermore, after the step S2, the following steps can also be performed: sieving the obtained powder material M, and performing respective plasma spheroidizations, so as to finally obtain spheroidal powder materials M with different particle sizes.

The sieved powder materials can be spheroidized by plasma spheroidization.

The spheroidal powder material M has a particle size of 1 μm to 500 μm.

In the method as a second of the alternative solutions, the microstructure of the $A_aM_b$ solidified state alloy is composed of the matrix phase with the ingredient A and the dispersed particle phase with the ingredient M, and helps subsequent separation. Specifically, when the acid reaction removal or the alkali reaction removal is used, the matrix phase with the ingredient A reacts with the corrosive solution to change into ions and enter the solution, and the dispersed particle phase with the ingredient M does not react with the corrosive solution and thus is separated from the solidified state alloy, so as to obtain a powder material with the ingredient M. When the vacuum volatilization removal is used, the matrix phase A with a lower melting point has strong volatility when approaching the melting point, whereas the dispersed particles M with a higher melting point can be better retained at this temperature. Therefore, after the matrix phase A is completely volatilized, the dispersed particles M are separated out, so as to obtain a corresponding powder material.

Therefore, compared with the traditional solid phase method, liquid phase method and gas phase method, as a second of the alternative solutions, the method has the advantages of simple process, easy operation and low cost, and thus can prepare multiple ultra-fine powder materials of nano-level, sub-micron-level and micron-level. The ultra-fine powder materials have good application prospects in the fields of catalysis, powder metallurgy, sterilization, powder injection molding and 3D printing.

DETAILED DESCRIPTION OF THE EMBODIMENTS

A method for preparing the powder material will be further described below in combination with the following specific embodiments.

Embodiment 1

This embodiment provides a method for preparing a nano-level B powder, which includes the following steps.

An alloy with a formulation molecular formula $Cu_{80}B_{20}$ was selected. Raw materials were weighed according to the formula, and subjected to vacuum induction melting to obtain an alloy melt with an ingredient $Cu_{80}B_{20}$. The alloy melt was prepared into $Cu_{80}B_{20}$ thin ribbon-like initial alloy fragments with a thickness of ~15 μm at a rate of ~$10^6$K/s by using copper roller spinning and rapid-solidification method. The microstructure of the fragments included a matrix phase composed of Cu and a dispersed particle phase composed of nano-level B particles. The dispersed particle phase had a particle size of 2 nm to 100 nm.

At room temperature, 0.25 g of the $Cu_{80}B_{20}$ initial alloy fragments prepared as above was immersed in 50 ml of an aqueous hydrochloric acid solution with a concentration of 2 mol/L and a temperature of 60° C. for reaction. During the reaction, the matrix phase composed of Cu reacted with the hot hydrochloric acid and entered the solution, whereas the nano-level B particles which did not react with the aqueous hydrochloric acid solution were gradually separated out in a dispersed manner. After 25 minutes, the obtained nano-level B particles were separated from the solution, cleaned and dried to obtain a nano-level B particle powder, with a particle size of 2 nm to 100 nm.

Embodiment 2

This embodiment provides a method for preparing a sub-micron-level B powder, which includes the following steps.

An alloy with a formulation molecular formula $Sn_{98}B_2$ was selected. Raw materials were weighed according to the formula, and subjected to vacuum induction melting to obtain an alloy melt with an ingredient $Sn_{98}B_2$. The alloy melt was prepared into $Sn_{98}B_2$ thin ribbon-like initial alloy fragments with a thickness of 150 μm at a rate of $10^3$K/s to $10^4$K/s by using copper roller spinning and rapid-solidification method. The microstructure of the fragments included a matrix phase composed of Sn and a dispersed particle phase composed of sub-micron-level B particles. The dispersed particle phase had a particle size of 100 nm to 2 μm.

At room temperature, 0.25 g of the $Sn_{98}B_2$ initial alloy fragments prepared as above was immersed in 50 ml of an aqueous sulfuric acid solution with a concentration of 0.5 mol/L for reaction. During the reaction, the matrix phase composed of the active element Sn reacted with an acid and entered the solution, whereas the sub-micron-level B particles which did not react with the acid were gradually separated out in a dispersed manner. After 20 minutes, the obtained sub-micron-level B particles were separated from the solution, cleaned and dried to obtain a sub-micron-level B particle powder, with a particle size of 100 nm to 2 μm.

Embodiment 3

This embodiment provides a method for preparing a nano-level Bi powder, which includes the following steps.

An alloy with a formulation molecular formula $Al_{75}B_{i25}$ was selected. Raw materials were weighed according to the formula, and subjected to vacuum induction melting to obtain an alloy melt with an ingredient $Al_{75}B_{i25}$. The alloy melt was prepared into $Al_{75}B_{i25}$ thin alloy ribbon with a thickness of ~20 μm at a rate of ~$10^6$K/s. The microstructure of the thin alloy ribbon included a matrix phase composed of Al and a dispersed particle phase composed of nano-level Bi particles. The dispersed particle phase had a particle size of 2 nm to 150 nm.

At room temperature, 0.5 g of the $Al_{75}B_{i25}$ initial alloy fragments prepared as above was immersed in 50 ml of an aqueous hydrochloric acid solution with a concentration of 1 mol/L for reaction. During the reaction, the matrix phase composed of the active element Al reacted with an acid and entered the solution, whereas the nano-level Bi particles which did not react with the acid were gradually separated out in a dispersed manner. After 20 minutes, the obtained nano-level Bi particles were separated from the solution, cleaned and dried to obtain a nano-level Bi particle powder, with a particle size of 2 nm to 150 nm.

Embodiment 4

This embodiment provides a method for preparing a sub-micron-level Fe powder, which includes the following steps.

An alloy with a formulation molecular formula $La_{75}Fe_{25}$ was selected. Raw materials were weighed according to the formula, and subjected to vacuum induction melting to obtain an alloy melt with an ingredient $La_{75}Fe_{25}$. The alloy melt was prepared into $La_{75}Fe_{25}$ thin ribbon-like initial alloy fragments with a thickness of 150 μm at a rate of $10^3$K/s to $10^4$K/s by using copper roller spinning and rapid-solidification method. The microstructure of the initial alloy fragments included a matrix phase composed of La and a dispersed particle phase composed of sub-micron-level Fe particles. The dispersed particle phase had a particle size of 200 nm to 3 μm.

At room temperature, 0.5 g of the $La_{75}Fe_{25}$ initial alloy fragments prepared as above was immersed in 50 ml of an aqueous hydrochloric acid solution with a concentration of 0.01 mol/L for reaction. During the reaction, the matrix phase composed of the active element La reacted with an acid and entered the solution, whereas the dispersed Fe particles having slightly lower activity were gradually separated out. During the reaction, an auxiliary magnetic field was applied to ensure the newly-separated Fe particles can be separated from the acid solution in time. After 30 minutes, the sub-micron-level Fe particles were gradually collected, cleaned and dried to obtain a sub-micron-level Fe particle powder, with a particle size of 200 nm to 3 μm.

Embodiment 5

This embodiment provides a method for preparing a sub-micron-level Fe powder, which includes the following steps.

An alloy with a formulation molecular formula $Li_{75}Fe_{25}$ was selected. Raw materials were weighed according to the formula, and subjected to vacuum induction melting to obtain an alloy melt with an ingredient $Li_{75}Fe_{25}$. The alloy melt was prepared into $Li_{75}Fe_{25}$ thin ribbon-like initial alloy fragments with a thickness of 150 μm at a rate of $10^3$K/s to $10^4$K/s by using copper roller spinning and rapid-solidification method. The microstructure of the initial alloy fragments included a matrix phase composed of Li and a dispersed particle phase composed of sub-micron-level Fe particles. The dispersed particle phase had a particle size of 200 nm to 3 μm.

At room temperature, 0.5 g of the $Li_{75}Fe_{25}$ initial alloy fragments prepared as above was immersed in 50 ml of an aqueous solution for reaction. During the reaction, the matrix phase composed of the active element Li reacted with water and entered the solution, whereas the dispersed Fe particles were separated out. After 5 minutes, the sub-micron-level Fe particles were collected gradually, cleaned and dried to obtain a sub-micron-level Fe particle powder, with a particle size of 200 nm to 3 μm.

Embodiment 6

This embodiment provides a method for preparing a nano-level Fe powder, which includes the following steps.

An alloy with a formulation molecular formula $Li_{75}Fe_{25}$ was selected. Raw materials were weighed according to the formula, and subjected to vacuum induction melting to obtain an alloy melt with an ingredient $Li_{75}Fe_{25}$. The alloy melt was prepared into $Li_{75}Fe_{25}$ thin ribbon-like initial alloy fragments with a thickness of ~15 μm at a rate of ~$10^6$K/s by using copper roller spinning and rapid-solidification method. The microstructure of the initial alloy fragments included a matrix phase composed of Li and a dispersed particle phase composed of nano-level Fe particles. The dispersed particle phase had a particle size of 2 nm to 200 nm.

At room temperature, 0.25 g of the $Li_{75}Fe_{25}$ initial alloy fragments prepared as above was immersed in 50 ml of an aqueous solution deoxygenated by argon gas for reaction. During the reaction, the matrix phase composed of the active element Li reacted with water and entered the solution, whereas the dispersed nano-level Fe particles were separated out. After 5 minutes, the obtained nano-level Fe particles were separated from the solution, so as to obtain a nano-level Fe particle powder with a particle size of 2 nm to 200 nm.

Embodiment 7

This embodiment provides a method for preparing a nano-level Ni powder, which includes the following steps.

An alloy with a formulation molecular formula $Li_{80}Ni_{20}$ was selected. Raw materials were weighed according to the formula, and subjected to vacuum induction melting to obtain an alloy melt with an ingredient $Li_{80}Ni_{20}$. The alloy melt was prepared into $Li_{80}Ni_{20}$ thin ribbon-like initial alloy fragments with a thickness of ~15 μm at a rate of ~$10^6$K/s by using copper roller spinning and rapid-solidification method. The microstructure of the initial alloy fragments included a matrix phase composed of Li and a dispersed particle phase composed of nano-level Ni particles. The dispersed particle phase had a particle size of 2 nm to 200 nm.

At room temperature, 0.25 g of the $Li_{80}Ni_{20}$ initial alloy fragments prepared as above was immersed in 50 ml of an aqueous solution deoxygenated by argon gas for reaction. During the reaction, the matrix phase composed of the active element Li reacted with water and entered the solution, whereas the dispersed nano-level Ni particles were separated out. After 5 minutes, the obtained nano-level Ni particles were separated from the solution, so as to obtain a nano-level Ni particle powder with a particle size of 2 nm to 200 nm.

Embodiment 8

This embodiment provides a method for preparing a nano-level Ag powder, which includes the following steps.

An alloy with a formulation molecular formula $Pb_{75}Ag_{25}$ was selected. Raw materials were weighed according to the formula, and subjected to vacuum induction melting to obtain an alloy melt with an ingredient $Pb_{75}Ag_{25}$. The alloy melt was prepared into $Pb_{75}Ag_{25}$ thin ribbon-like initial alloy fragments with a thickness of ~20 μm at a rate of ~$10^6$K/s by using copper roller spinning and rapid-solidification method. The microstructure of the initial alloy fragments included a matrix phase composed of Pb and a dispersed particle phase composed of nano-level Ag particles. The dispersed particle phase had a particle size of 2 nm to 200 nm.

At room temperature, 0.5 g of the $Pb_{75}Ag_{25}$ initial alloy fragments prepared as above was immersed in 50 ml of an aqueous hydrochloric acid solution with a concentration of 2 mol/L for reaction. During the reaction, the matrix phase composed of the active element Pb reacted with an acid and entered the solution, whereas the nano-level Ag particles which did not react with the acid were gradually separated out in a dispersed manner. After 10 minutes, the obtained sub-spheroidal nano-level Ag particles were separated from the solution and then cleaned and dried so as to obtain a nano-level Ag particle powder with a particle size of 2 nm to 200 nm.

Embodiment 9

This embodiment provides a method for preparing a micron-level Ag powder, which includes the following steps.

An alloy with a formulation molecular formula $Pb_{75}Ag_{25}$ was selected. Raw materials were weighed according to the formula, and subjected to vacuum induction melting to obtain an alloy melt with an ingredient $Pb_{75}Ag_{25}$. The alloy melt was prepared into $Pb_{75}Ag_{25}$ sheets with a thickness of ~2 mm at a rate of ~500K/s by casting. The microstructure of the sheets included a matrix phase composed of Pb and a dispersed particle phase composed of micron-level Ag dendritic particles. The dispersed particle phase had a particle size of 0.5 μm to 30 μm.

At room temperature, 0.5 g of the $Pb_{75}Ag_{25}$ initial alloy fragments prepared as above was immersed in 50 ml of an aqueous hydrochloric acid solution with a concentration of 3 mol/L for reaction. During the reaction, the matrix phase composed of the active element Pb reacted with an acid and entered the solution, whereas the micron-level Ag particles which did not react with the acid were gradually separated out in a dispersed manner. After 20 minutes, the obtained micron-level Ag dendritic particles were separated from the solution and then cleaned and dried so as to obtain a micron-level Ag particle powder with a particle size of 0.5 μm to 30 μm.

Embodiment 10

This embodiment provides a method for preparing a nano-level Ag powder, which includes the following steps.

An alloy with a formulation molecular formula $K_{75}Ag_{25}$ was selected. Raw materials were weighed according to the formula, and subjected to vacuum induction melting to obtain an alloy melt with an ingredient $K_{75}Ag_{25}$. The alloy melt was prepared into $K_{75}Ag_{25}$ thin ribbon-like initial alloy fragments with a thickness of ~20 μm at a rate of ~$10^6$K/s by using copper roller spinning and rapid-solidification method. The microstructure of the initial alloy fragments included a matrix phase composed of K and a dispersed particle phase composed of nano-level Ag particles. The dispersed particle phase had a particle size of 2 nm to 200 nm.

At room temperature, 0.5 g of the $K_{75}Ag_{25}$ initial alloy fragments prepared as above was immersed in 50 ml of an aqueous solution for reaction. During the reaction, the matrix phase composed of K reacted with water and entered the solution, whereas the nano-level Ag particles which did not react with water were gradually separated out in dispersed manner. After 5 minutes, the obtained nano-level Ag particles were separated from the solution and then cleaned and dried so as to obtain a nano-level Ag particle powder with a particle size of 2 nm to 200 nm.

Embodiment 11

This embodiment provides a method for preparing a sub-micron-level Ag powder, which includes the following steps.

An alloy with a formulation molecular formula $Na_{75}Ag_{25}$ was selected. Raw materials were weighed according to the formula, and subjected to vacuum induction melting to obtain an alloy melt with an ingredient $Na_{75}Ag_{25}$. The alloy melt was prepared into $Na_{75}Ag_{25}$ thin ribbon-like initial alloy fragments with a thickness of ~150 μm at a rate of $10^3$K/s to $10^4$K/s by using copper roller spinning and rapid-solidification method. The microstructure of the initial alloy fragments included a matrix phase composed of Na and a dispersed particle phase composed of sub-micron-level Ag particles. The dispersed particle phase had a particle size of 100 nm to 3 μm.

At room temperature, 0.5 g of the $Na_{75}Ag_{25}$ initial alloy fragments prepared as above was immersed in 50 ml of an aqueous solution for reaction. During the reaction, the matrix phase composed of Na reacted with water and entered the solution, whereas the sub-micron-level Ag particles which did not react with water were gradually separated out in dispersed manner. After 5 minutes, the obtained sub-micron-level Ag particles were separated from the solution and then cleaned and dried so as to obtain a sub-micron-level Ag particle powder with a particle size of 100 nm to 3 μm.

Embodiment 12

This embodiment provides a method for preparing a micron-level Cu powder, which includes the following steps.

An alloy with a formulation molecular formula $Pb_{80}Cu_{20}$ was selected. Raw materials were weighed according to the formula, and subjected to vacuum induction melting to obtain an alloy melt with an ingredient $Pb_{80}Cu_{20}$. The alloy melt was prepared into $Pb_{80}Cu_{20}$ sheets with a thickness of 3 mm at a rate of ~200K/s. The microstructure of the sheets included a matrix phase composed of Pb and a dispersed particle phase composed of micron-level Cu particles. The dispersed particle phase had a particle size of 1 μm to 50 μm.

At room temperature, 0.5 g of the $Pb_{80}Cu_{20}$ initial alloy prepared as above was immersed in 100 ml of an aqueous hydrochloric acid solution with a concentration of 2 mol/L for reaction. During the reaction, the matrix phase composed of the active element Pb reacted with an acid and entered the solution, whereas the micron-level Cu particles difficult to react with the acid were gradually separated out in dispersed manner. After 20 minutes, the obtained micron-level Cu particles were separated from the solution and then cleaned and dried so as to obtain a micron-level Cu particle powder with a particle size of 1 μm to 50 μm.

Embodiment 13

This embodiment provides a method for preparing a nano-level Cu powder, which includes the following steps.

An alloy with a formulation molecular formula $Pb_{80}Cu_{20}$ was selected. Raw materials were weighed according to the formula, and subjected to vacuum induction melting to obtain an alloy melt with an ingredient $Pb_{80}Cu_{20}$. The alloy melt was prepared into $Pb_{80}Cu_{20}$ thin ribbon-like initial alloy fragments with a thickness of ~15 μm at a rate of ~$10^6$K/s by using copper roller spinning and rapid-solidification method. The microstructure of the initial alloy fragments included a matrix phase composed of Pb and a dispersed particle phase composed of nano-level Cu particles. The dispersed particle phase had a particle size of 2 nm to 200 nm.

At room temperature, 0.2 g of the $Pb_{80}Cu_{20}$ initial alloy fragments prepared as above was immersed in 200 ml of an aqueous hydrochloric acid solution with a concentration of 0.5 mol/L for reaction. During the reaction, the matrix phase composed of the active element Pb reacted with an acid and entered the solution, whereas the nano-level Cu particles difficult to react with the acid were gradually separated out in dispersed manner. After 5 minutes, the obtained nano-level Cu particles were separated from the solution and then cleaned and dried so as to obtain a nano-level Cu particle powder with a particle size of 2 nm to 200 nm.

Embodiment 14

This embodiment provides a method for preparing a nano-level B powder, which includes the following steps.

An alloy with a formulation molecular formula $Zn_{80}B_{20}$ was selected. Raw materials were weighed according to the formula, and subjected to vacuum induction melting to obtain an alloy melt with an ingredient $Zn_{80}B_{20}$. The alloy melt was prepared into $Zn_{80}B_{20}$ thin ribbon-like initial alloy fragments with a thickness of 25 μm at a rate of $10^5$K/s by using copper roller spinning and rapid-solidification method. The microstructure of the initial alloy fragments included a matrix phase composed of Zn and a dispersed particle phase composed of nano-level B particles. The dispersed particle phase had a particle size of 2 nm to 100 nm.

At room temperature, the $Zn_{80}B_{20}$ initial alloy fragments prepared as above was immersed in an aqueous hydrochloric acid solution with a concentration of 2 mol/L for reaction. During the reaction, the matrix phase composed of Zn reacted with hydrochloric acid and entered the solution, whereas the nano-level B particles which did not react with hydrochloric acid were gradually separated out in dispersed manner. After 10 minutes, the obtained nano-level B particles were separated from the solution and then cleaned and dried so as to obtain a nano-level B particle powder with a particle size of 2 nm to 100 nm.

Embodiment 15

This embodiment provides a method for preparing a sub-micron-level B powder, which includes the following steps.

An alloy with a formulation molecular formula $Zn_{80}B_{20}$ was selected. Raw materials were weighed according to the formula, and subjected to vacuum induction melting to obtain an initial alloy melt with an ingredient $Zn_{80}B_{20}$. The initial alloy melt was prepared into $Zn_{80}B_{20}$ thin ribbon-like initial alloy fragments with a thickness of 200 μm at a rate of $10^3$K/s to $10^4$K/s by using copper roller spinning and rapid-solidification method. The microstructure of the initial alloy fragments included a matrix phase composed of Zn and a dispersed particle phase composed of sub-micron-level B particles. The dispersed particle phase had a particle size of 100 nm to 2 μm.

At room temperature, the $Zn_{80}B_{20}$ initial alloy fragments prepared as above was immersed in NaOH aqueous solution with a concentration of 5 mol/L for reaction. During the reaction, the matrix phase composed of Zn reacted with a base and entered the solution, whereas the sub-micron-level B particles which did not react with base were gradually separated out in dispersed manner. After 20 minutes, the obtained sub-micron-level B particles were separated from the solution and then cleaned and dried so as to obtain a sub-micron-level B particle powder with a particle size of 100 nm to 2 μm.

Embodiment 16

This embodiment provides a method for preparing a nano-level B powder, which includes the following steps.

An alloy with a formulation molecular formula $Zn_{80}B_{20}$ was selected. Raw materials were weighed according to the formula, and subjected to vacuum induction melting to obtain an initial alloy melt with an ingredient $Zn_{80}B_{20}$. The initial alloy melt was prepared into $Zn_{80}B_{20}$ thin ribbon-like initial alloy fragments with a thickness of 25 μm at a rate of $10^5$K/s by using copper roller spinning and rapid-solidification method. The microstructure of the initial alloy fragments included a matrix phase composed of Zn and a dispersed particle phase composed of nano-level B particles. The dispersed particle phase had a particle size of 2 nm to 100 nm.

At room temperature, the $Zn_{80}B_{20}$ initial alloy fragments prepared as above was placed into a vacuum tube in which a vacuum degree was maintained below 5 Pa. The vacuum tube was placed in a tubular furnace with a temperature of 400° C. During heating process, the matrix phase composed of Zn in the alloy was continuously volatilized and re-condensed in other low-temperature regions of the vacuum tube whereas the non-volatile nano-level B particles were gradually separated out in a dispersed manner. After 30 minutes, a nano-level B particle powder with a particle size of 2 nm to 100 nm was obtained.

Embodiment 17

This embodiment provides a method for preparing a nano-level Cr powder, which includes the following steps.

An alloy with a formulation molecular formula $Zn_{85}Cr_{15}$ was selected. Raw materials were weighed according to the formula, and subjected to vacuum induction melting to obtain an initial alloy melt with an ingredient $Zn_{85}Cr_{15}$. The initial alloy melt was prepared into $Zn_{85}Cr_{15}$ thin ribbon-like initial alloy fragments with a thickness of 25 μm at a rate of $10^5$K/s by using copper roller spinning and rapid-solidification method. The microstructure of the initial alloy fragments included a matrix phase composed of Zn and a dispersed particle phase composed of nano-level Cr particles. The dispersed particle phase had a particle size of 2 nm to 100 nm.

At room temperature, the $Zn_{85}Cr_{15}$ initial alloy fragments prepared as above was immersed in an aqueous hydrochloric acid solution with a concentration of 1 mol/L for reaction. During the reaction, the matrix phase composed of Zn reacted with hydrochloric acid and entered the solution, whereas the nano-level Cr particles which did not react with the diluted aqueous hydrochloric acid solution were gradually separated out in dispersed manner. After 10 minutes, the obtained nano-level Cr particles were separated from the solution and then cleaned and dried so as to obtain a nano-level Cr particle powder with a particle size of 2 nm to 100 nm.

Embodiment 18

This embodiment provides a method for preparing a micron-level Cr powder, which includes the following steps.

An alloy with a formulation molecular formula $Zn_{85}Cr_{15}$ was selected. Raw materials were weighed according to the formula, and subjected to vacuum induction melting to obtain an initial alloy melt with an ingredient $Zn_{85}Cr_{15}$. The initial alloy melt was prepared into $Zn_{85}Cr_{15}$ sheets with a thickness of 2 mm at a rate of 300K/s by casting. The microstructure of the sheets included a matrix phase composed of Zn and a dispersed particle phase composed of micron-level Cr dendritic particles. The dispersed particle phase had a particle size of 0.5 μm to 30 μm.

At room temperature, the $Zn_{85}Cr_{15}$ initial alloy sheets prepared as above was immersed in an aqueous hydrochloric acid solution with a concentration of 1 mol/L for reaction. During the reaction, the matrix phase composed of Zn reacted with hydrochloric acid and entered the solution, whereas the micron-level Cr particles which did not react with the diluted aqueous hydrochloric acid solution were gradually separated out in dispersed manner. After 30 minutes, the obtained micron-level Cr particles were separated from the solution and then cleaned and dried so as to obtain a micron-level Cr particle powder with a particle size of 0.5 μm to 30 μm.

Embodiment 19

This embodiment provides a method for preparing a spheroidal micron-level Cr powder, which includes the following steps.

An alloy with a formulation molecular formula $Zn_{85}Cr_{15}$ was selected. Raw materials were weighed according to the formula, and subjected to vacuum induction melting to obtain an initial alloy melt with an ingredient $Zn_{85}Cr_{15}$. The initial alloy melt was prepared into $Zn_{85}Cr_{15}$ sheets with a thickness of 2 mm at a rate of 300K/s by casting. The microstructure of the sheets included a matrix phase composed of Zn and a dispersed particle phase composed of micron-level Cr dendritic particles. The dispersed particle phase had a particle size of 0.5 μm to 30 μm.

At room temperature, the $Zn_{85}Cr_{15}$ initial alloy sheets prepared as above was immersed in an aqueous hydrochloric acid solution with a concentration of 1 mol/L for reaction. During the reaction, the matrix phase composed of Zn reacted with hydrochloric acid and entered the solution, whereas the micron-level Cr particles which did not react with the diluted aqueous hydrochloric acid solution were gradually separated out in dispersed manner. After 30 minutes, the obtained micron-level Cr particles were separated from the solution and then cleaned and dried so as to obtain a micron-level Cr particle powder with a particle size of 0.5 μm to 30 μm.

The obtained micron-level Cr particle powder was sieved such that a spheroidal micron-level Cr powder with a particle size of 5 μm to 30 μm was further obtained by performing mature plasma spheroidization.

Embodiment 20

This embodiment provides a method for preparing a sub-micron-level V powder, which includes the following steps.

An alloy with a formulation molecular formula $Zn_{85}V_{15}$ was selected. Raw materials were weighed according to the formula, and subjected to vacuum induction melting to obtain an initial alloy melt with an ingredient $Zn_{85}V_{15}$. The initial alloy melt was prepared into $Zn_{85}V_{15}$ thin ribbon-like initial alloy fragments with a thickness of 200 μm at a rate of $10^3$K/s~$10^4$K/s by using copper roller spinning and rapid-solidification method. The microstructure of the initial alloy fragments included a matrix phase composed of Zn and a dispersed particle phase composed of sub-micron-level V particles. The dispersed particle phase had a particle size of 100 nm to 2 μm.

At room temperature, the $Zn_{85}V_{15}$ initial alloy fragments prepared as above was immersed in NaOH aqueous solution with a concentration of 5 mol/L for reaction. During the reaction, the matrix phase composed of Zn reacted with a base and entered the solution, whereas the sub-micron-level V particles which did not react with the base were gradually separated out in dispersed manner. After 20 minutes, the obtained sub-micron-level V particles were separated from the solution and then cleaned and dried so as to obtain a sub-micron-level V particle powder with a particle size of 100 nm to 2 μm.

Embodiment 21

This embodiment provides a method for preparing a nano-level Mn powder, which includes the following steps.

An initial alloy with a formulation molecular formula $Mg_{85}Mn_{15}$ was selected. Raw materials were weighed according to the formula, and subjected to vacuum induction melting to obtain an initial alloy melt with an ingredient $Mg_{85}Mn_{15}$. The initial alloy melt was prepared into $Mg_{85}Mn_{15}$ thin ribbon-like initial alloy fragments with a thickness of 20 μm at a rate of $10^6$K/s by using copper roller spinning and rapid-solidification method. The microstructure of the initial alloy fragments included a matrix phase composed of Mg and a dispersed particle phase composed of nano-level Mn particles. The dispersed particle phase had a particle size of 2 nm to 100 nm.

At room temperature, the $Mg_{85}Mn_{15}$ initial alloy fragments prepared as above was placed into a vacuum tube in which a vacuum degree was maintained below 0.1 Pa. The vacuum tube was placed in a tubular furnace with a temperature of 600° C. During heating process, the matrix phase composed of Mg in the alloy was continuously volatilized and re-condensed in other low-temperature regions of the vacuum tube whereas the nano-level Mn particles difficult to volatilize were gradually separated out in a dispersed manner. After 0.5 h, a nano-level Mn particle powder with a particle size of 2 nm to 100 nm was obtained.

Embodiment 22

This embodiment provides a method for preparing a nano-level FeMn powder, which includes the following steps.

An alloy with a formulation molecular formula $Mg_{80}Fe_{10}Mn_{10}$ was selected. Raw materials were weighed according to the formula, and subjected to vacuum induction melting to obtain an initial alloy melt with an ingredient $Mg_{80}Fe_{10}Mn_{10}$. The initial alloy melt was prepared into $Mg_{80}Fe_{10}Mn_{10}$ thin ribbon-like initial alloy fragments with a thickness of 20 μm at a rate of $10^6$K/s by using copper roller spinning and rapid-solidification method. The microstructure of the initial alloy fragments included a matrix phase composed of Mg and a dispersed particle phase composed of nano-level FeMn particles. The dispersed particle phase had a particle size of 2 nm to 100 nm.

At room temperature, the $Mg_{80}Fe_{10}Mn_{10}$ initial alloy fragments prepared as above was placed into a vacuum tube in which a vacuum degree was maintained below 0.1 Pa. The vacuum tube was placed in a tubular furnace with a temperature of 600° C. During heating process, the matrix phase composed of Mg in the alloy was continuously volatilized and re-condensed in other low-temperature regions of the vacuum tube whereas the nano-level FeMn particles difficult to volatilize were gradually separated out in a dispersed manner. After 0.5 h, a nano-level FeMn particle powder with a particle size of 2 nm to 100 nm was obtained.

Embodiment 23

This embodiment provides a method for preparing a nano-level Si powder, which includes the following steps.

An initial alloy with a formulation molecular formula $Zn_{80}Si_{20}$ was selected. Raw materials were weighed according to the formula, and subjected to vacuum induction melting to obtain an initial alloy melt with an ingredient $Zn_{80}Si_{20}$. The initial alloy melt was prepared into $Zn_{80}Si_{20}$ thin ribbon-like initial alloy fragments with a thickness of 20 μm at a cooling rate of $10^6$K/s by using copper roller spinning and rapid-solidification method. The microstructure of the initial alloy fragments included a matrix phase composed of Zn and a dispersed particle phase composed of Nano-level Si particles. The dispersed particle phase had a particle size of 5 nm to 300 nm.

At room temperature, the $Zn_{80}Si_{20}$ initial alloy fragments prepared as above was immersed in NaOH aqueous solution with a concentration of 10 mol/L for reaction. During the reaction, the matrix phase composed of Zn reacted with a base and entered the solution, whereas the nano-level Si particles which did not react with the base were gradually separated out in dispersed manner. After 10 minutes, the obtained sub-spheroidal nano-level Si particles were separated from the solution and then cleaned and dried so as to obtain a nano-level Si particle powder with a particle size of 5 nm to 300 nm.

Embodiment 24

This embodiment provides a method for preparing a sub-micron-level Si powder, which includes the following steps.

An initial alloy with a formulation molecular formula $Sn_{80}Si_{20}$ was selected. Raw materials were weighed according to the formula, and subjected to vacuum induction melting to obtain an initial alloy melt with an ingredient $Sn_{80}Si_{20}$. The initial alloy melt was prepared into $Sn_{80}Si_{20}$ thin ribbon-like initial alloy fragments with a thickness of 150 μm at a cooling rate of $10^3$K/s~$10^4$K/s by using copper roller spinning and rapid-solidification method. The microstructure of the initial alloy fragments included a matrix phase composed of Sn and a dispersed particle phase composed of sub-micron-level Si particles. The dispersed particle phase had a particle size of 20 nm to 2 μm.

At room temperature, the $Sn_{80}Si_{20}$ initial alloy fragments prepared as above was immersed in aqueous nitric acid solution with a concentration of 0.5 mol/L for reaction. During the reaction, the matrix phase composed of the active element Sn reacted with an acid and entered the solution, whereas the sub-micron-level Si particles which did not react with the acid were gradually separated out in dispersed manner. After 20 minutes, the obtained sub-micron-level Si particles were separated from the solution and then cleaned and dried so as to obtain a sub-micron-level Si particle powder with a particle size of 20 nm to 2 μm.

Embodiment 25

This embodiment provides a method for preparing a micron-level Ge powder, which includes the following steps.

An initial alloy with a formulation molecular formula $Sn_{75}Ge_{25}$ was selected. Raw materials were weighed according to the formula, and subjected to vacuum induction melting to obtain an initial alloy melt with an ingredient $Sn_{75}Ge_{25}$. The initial alloy melt was prepared into $Sn_{75}Ge_{25}$ initial alloy at a solidification rate of 100K/s by solidification. The microstructure of the initial alloy included a matrix phase composed of Sn and a dispersed particle phase composed of micron-level Ge particles. The dispersed particle phase had a particle size of 2 μm to 120 μm.

At room temperature, the $Sn_{75}Ge_{25}$ initial alloy prepared as above was immersed in an aqueous hydrochloric acid solution with a concentration of 1 mol/L for reaction. During the reaction, the matrix phase composed of the active element Sn reacted with an acid and entered the solution, whereas the dispersed Ge particles with poor activity were gradually separated out. After 20 minutes, the obtained Ge particles were separated from the solution and then cleaned and dried so as to obtain a micron-level Ge particle powder with a particle size of 2 μm to 120 μm.

Embodiment 26

This embodiment provides a method for preparing a nano-level Si—Ge powder, which includes the following steps.

An initial alloy with a formulation molecular formula $Zn_{80}Si_{10}Ge_{10}$ was selected. Raw materials were weighed according to the formula, and subjected to vacuum induction melting to obtain an initial alloy melt with an ingredient $Zn_{80}Si_{10}Ge_{10}$. The initial alloy melt was prepared into $Zn_{80}Si_{10}Ge_{10}$ thin ribbon-like initial alloy fragments with a thickness of 20 μm at a cooling rate of $10^6$K/s by using copper roller spinning and rapid-solidification method. The microstructure of the initial alloy fragments included a matrix phase composed of Zn and a dispersed particle phase composed of nano-level Si—Ge particles. The dispersed particle phase had a particle size of 5 nm to 300 nm.

At room temperature, the $Zn_{80}Si_{10}Ge_{10}$ initial alloy fragments prepared as above was immersed in an aqueous hydrochloric acid solution with a concentration of 1 mol/L for reaction. During the reaction, the matrix phase composed of the active element Zn reacted with an acid and entered the solution, whereas the nano-level Si—Ge particles which did not react with the acid solution were gradually separated out in dispersed manner. After 10 minutes, the obtained sub-spheroidal nano-level Si—Ge particles were separated from the solution and then cleaned and dried so as to obtain a nano-level Si—Ge particle powder with a particle size of 5 nm to 300 nm.

Embodiment 27

This embodiment provides a method for preparing a sub-micron-micron-level Fe powder, which includes the following steps.

Fe sheets and rare earth La raw materials with the atomic percent contents of an impurity element T (including O, H, N, P, S, F, Cl, Br and I) being 1 at. % and 2.5 at. % respectively were selected. The alloy raw materials were melted according to the molar ratio of La:Fe which was about 2:1, so as to obtain a homogeneous initial alloy melt with a major atomic percent ingredient being $La_{65.3}Fe_{32.7}T_2$.

The initial alloy melt was prepared into a $La_{65.3}Fe_{32.7}T_2$ alloy ribbon with a thickness of ~100 μm at a solidification rate of about ~$10^4$K/s by using copper roller spinning technology. The solidification structure of the alloy ribbon was composed of a matrix phase with a major atomic percent ingredient being $La_{97.2}T_{2.8}$ and a dispersed particle phase with a major ingredient being $Fe_{99.7}T_{0.3}$. The shape of the $Fe_{99.7}T_{0.3}$ dispersed particles was sub-spheroidal or dendritic, with its particle size of 500 nm to 3 μm. The volume percent content of the $Fe_{99.7}T_{0.3}$ dispersed particles in the alloy ribbon was about 14%. The $La_{97.2}T_{2.8}$ matrix phase in the alloy ribbon was removed by using a dilute acid solution, while the separated $Fe_{99.7}T_{0.3}$ dispersed particles were separated from the dilute acid solution quickly by using Fe magnetism, so as to obtain a sub-micron-micron-level powder with the major ingredient of $Fe_{99.7}T_{0.3}$, which had a particle size of 500 nm to 3 μm. The total content of O, H, N, P, S, F, Cl, Br and I contained therein was 0.3 at. %.

The obtained sub-micron-micron-level Fe powder can be used in magnetic materials.

Embodiment 28

This embodiment provides a method for preparing a nano-level Fe powder, which includes the following steps.

Fe sheets and rare earth La raw materials with the atomic percent contents of an impurity element T (including O, H, N, P, S, F, Cl, Br and I) being 1 at. % and 2.5 at. % respectively were selected. The alloy raw materials were melted according to the molar ratio of La:Fe which was about 60:40, so as to obtain a homogeneous initial alloy melt with a major atomic percent ingredient being $La_{58.5}Fe_{39.6}T_{1.9}$.

The initial alloy melt was prepared into a $La_{58.5}Fe_{39.6}T_{1.9}$ alloy ribbon with a thickness of ~20 μm at a solidification rate of about ~$10^6$K/s by using copper roller spinning technology. The solidification structure of the alloy ribbon was composed of a matrix phase with a major atomic percent ingredient being $La_{97}T_3$ and a dispersed particle phase with a major ingredient being $Fe_{99.75}T_{0.25}$. The shape of the $Fe_{99.75}T_{0.25}$ dispersed particles was sub-spheroidal, with its particle size of 20 nm to 200 nm. The volume percent content of the $Fe_{99.75}T_{0.25}$ dispersed particles in the alloy ribbon was about 17.5%.

By using the natural oxidation-powdering process of La in the air and the magnetism of Fe particles, the Fe particles were separated from an oxide generated by La powdering so as to obtain a nano-level Fe particle with its particle size of 20 nm to 200 nm. The total content of O, H, N, P, S, F, Cl, Br and I contained in the nano-level Fe powder was 0.25 at. %.

Embodiment 29

This embodiment provides a method for preparing a nano-level Fe powder, which includes the following steps.

Fe sheets and rare earth La raw materials with the atomic percent contents of an impurity element T (including O, H, N, P, S, F, Cl, Br and I) being 1 at. % and 2.5 at. % respectively were selected. The La raw material further contains 1 at. % of Ce, and the Fe raw material further contains 0.5 at. % of Mn. The alloy raw materials were melted according to the molar ratio of La:Fe which was about 60:40, so as to obtain a homogeneous initial alloy melt with a major atomic percent ingredient being $(La_{99}Ce_1)_{58.5}(Fe_{99.5}Mn_{0.5})_{39.6}T_{1.9}$.

The initial alloy melt was prepared into a $(La_{99}Ce_1)_{58.5}(Fe_{99.5}Mn_{0.5})_{39.6}T_{1.9}$ alloy ribbon with a thickness of ~20 μm at a solidification rate of about ~$10^6$K/s by using copper roller spinning technology. The solidification structure of the alloy ribbon was composed of a matrix phase with a major atomic percent ingredient being $(La_{99}Ce_1)_{97}T_3$ and a dispersed particle phase with a major ingredient being $(Fe_{99.5}Mn_{0.5})_{99.75}T_{9.25}$. The shape of the $(Fe_{99.5}Mn_{0.5})_{99.75}T_{0.25}$ dispersed particles was sub-spheroidal, with its particle size of 20 nm to 200 nm. The volume percent content of the $(Fe_{99.5}Mn_{0.5})_{99.75}T_{0.25}$ dispersed particles in the alloy ribbon was about 17.5%. Moreover, the introduction of Mn and Ce into the alloy melt does not cause generation of an intermetallic compound composed of La, Ce and Fe, Mn in the initial alloy ribbon; Further, the introduction does not affect the structural characteristics of the matrix phase and the dispersed particle phase in the alloy ribbon and the law of decrease of the impurity content of the dispersed particle phase.

By using the natural oxidation-powdering process of La in the air and the magnetism of Fe particles, the $(Fe_{99.5}Mn_{0.5})_{99.75}T_{0.25}$ particles were separated from an oxide generated by La powdering so as to obtain a nano-level $(Fe_{99.5}Mn_{0.5})_{99.75}T_{0.25}$ particle with its particle size of 20 nm to 200 nm. The total content of O, H, N, P, S, F, Cl, Br and I contained in the nano-level $(Fe_{99.5}Mn_{0.5})_{99.75}T_{0.25}$ powder was 0.25 at. %

The technical features of the above embodiments may be arbitrarily combined. For the purpose of conciseness of depiction, all possible combinations of the technical features of the above embodiments are not described. However, as long as there is no contradiction in the combinations of these technical features, they shall be considered to be within the scope of the present disclosure.

The above embodiments only show several implementations of the present disclosure, which are described in details. But, the detailed descriptions shall not be understood as limitation to the scope of the present disclosure. It should be noted that, for ordinary persons skilled the prior arts, a number of variations and improvements can be made without departing from the concept of the present disclosure and shall all fall within the scope of protection of the present disclosure. Therefore, the scope of protection of the present disclosure shall be subjected to the appended claims.

The invention claimed is:

1. A method for preparing a powder material, comprising the following steps:
    at step 1: selecting initial alloy raw materials, and melting the initial alloy raw materials according to a ratio of initial alloy ingredients to obtain a homogeneous initial alloy melt containing an impurity element T, wherein T comprises at least one of O, H, N, P, S, F, Cl, I, and Br, and an ingredient of the initial alloy melt is $A_aM_bT_d$; and M comprises at least one of Bi, Si and Ge; wherein; when M comprises Bi, A comprises Al; when M comprises at least one of Si and Ge, A comprises Al; a, b and d represents atomic percent contents of corresponding constituent elements, and $60\% \leq a < 99.5\%$, $0.5\% \leq b < 40\%$ and $0 < d \leq 10\%$;
    at step 2: solidifying the initial alloy melt into an initial alloy ribbon; wherein a solidification structure of the initial alloy ribbon comprises a matrix phase and a dispersed particle phase; the matrix phase has a lower melting point than the dispersed particle phase, the dispersed particle phase is wrapped in the matrix phase; during the solidification of the initial alloy melt, the impurity element T in the initial alloy melt is redistributed in the dispersed particle phase and the matrix phase, and is enriched in the matrix phase, so as to purify the dispersed particle phase;
    wherein a major ingredient of the dispersed particle phase in the initial alloy ribbon is $M_{x1}T_{z1}$, an average-ingredient of the matrix phase is $A_{x2}T_{z2}$; and $98.5\% \leq x1 \leq 100\%$, $0 \leq z1 \leq 1.5\%$; $80\% \leq x2 < 100\%$, $0 < z2 \leq 20\%$; $z1 < d < z2$; x1, z1, x2, and z2 represent atomic percent contents of the corresponding constituent elements respectively;
    at step 3: removing the matrix phase in the initial alloy ribbon, and retaining the dispersed particle phase which is not removed at the same time during the removal of the matrix phase; collecting a separated dispersed particle phase, so as to obtain a target high-purity powder material composed of original dispersed particles.

2. The method of claim 1, wherein a method for removing the matrix phase in the alloy ribbon comprises at least one of acid reaction removal, alkali reaction removal, vacuum volatilization removal, and matrix phase natural oxidation-powdering peeling removal.

3. The method of claim 1, wherein the target powder material has a particle size of 2 nm to 3 mm.

4. The method of claim 1, further comprising applying the powder material in catalytic materials.

5. The method of claim 1, further comprising applying the powder material in powder metallurgy.

6. The method of claim 1, further comprising applying the powder material in composite materials.

7. The method of claim 1, further comprising applying the powder material in coatings.

8. An alloy ribbon, comprising an endogenous powder and a wrapping body; a solidification structure of the alloy ribbon comprises a matrix phase and a dispersed particle phase, the matrix phase is the wrapping body, and the dispersed particle phase is the endogenous powder; the wrapping body has a lower melting point than the endogenous powder, and the endogenous powder is wrapped in the wrapping body;
    a major ingredient of the endogenous powder in the alloy ribbon is $M_{x1}T_{z1}$, an ingredient of the wrapping body is $A_{x2}T_{z2}$; and $98.5\% \leq x1 \leq 100\%$, $0 \leq z1 \leq 1.5\%$; $80\% \leq x2 < 100\%$, $0 < z2 \leq 20\%$; $z1 < z2$; x1, z1, x2, and z2 represent atomic percent contents of the corresponding constituent elements respectively and M comprises at least one of Bi, Si and Ge; wherein; when M comprises Bi, A comprises Al; when M comprises at least one of Si and Ge, A comprises Al; and T comprises at least one of O, H, N, P, S, F, Cl, I, and Br.

9. The alloy ribbon of claim 8, wherein the alloy ribbon has a thickness of 5 μm to 10 mm, and a width of a cross section of the alloy ribbon is two or more times the thickness.

10. The alloy ribbon of claim 8, wherein the endogenous powder has a particle size of 2 nm to 99 μm.

11. The alloy ribbon of claim 8, wherein the endogenous powder has a particle size of 2 nm to 1 μm.

* * * * *